Nov. 16, 1971 V. KUPCIKEVICIUS 3,619,974
APPARATUS FOR EXPELLING AIR FROM A BAGGED PRODUCT
Filed June 26, 1970 2 Sheets-Sheet 1
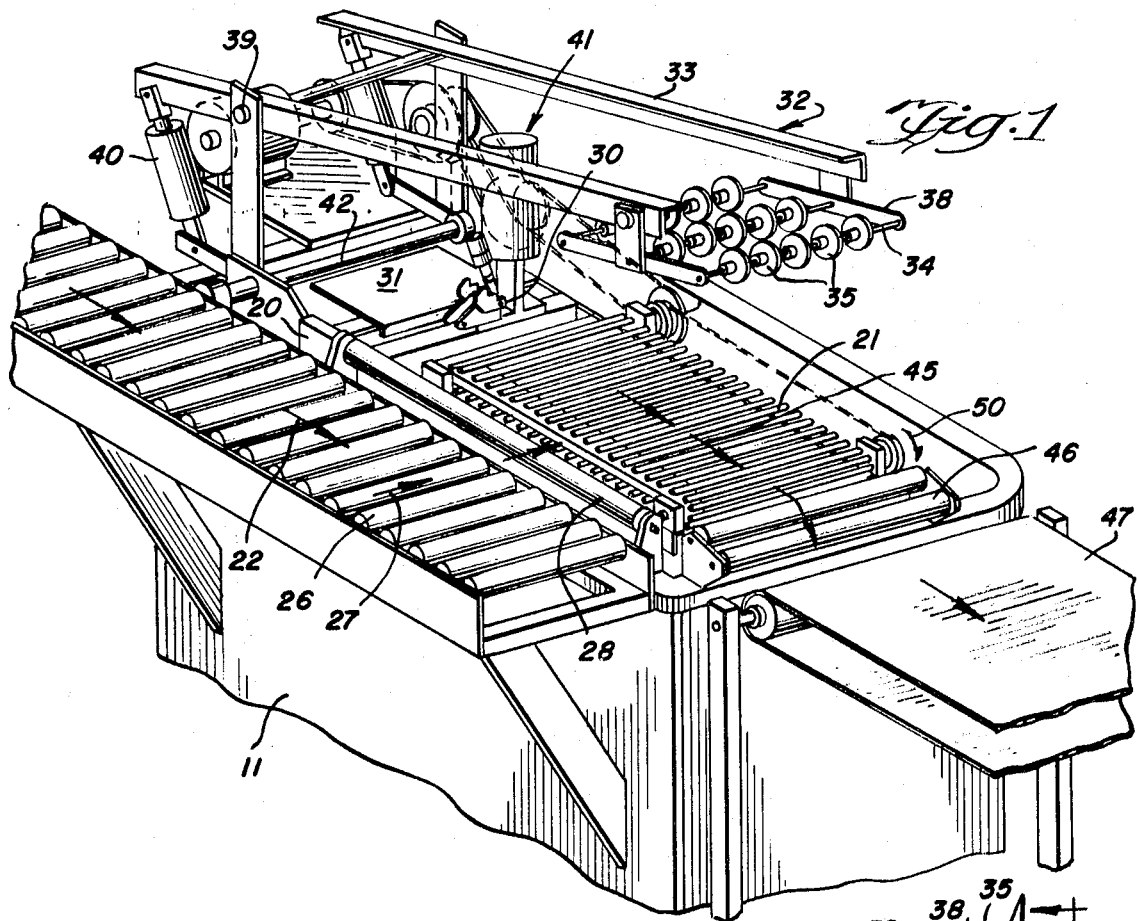
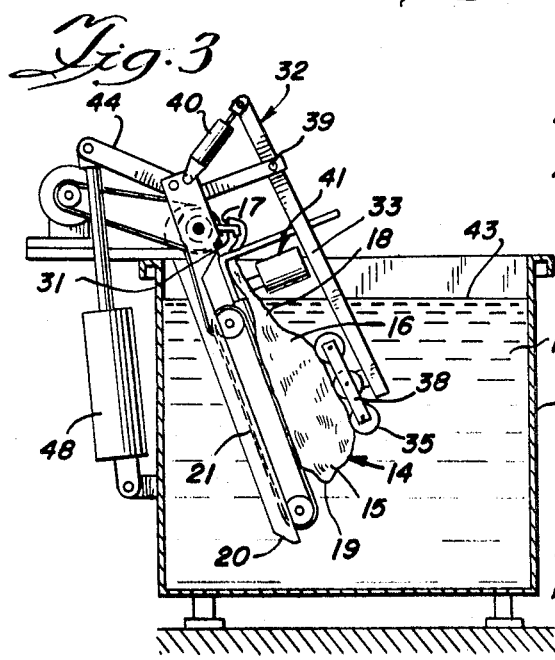
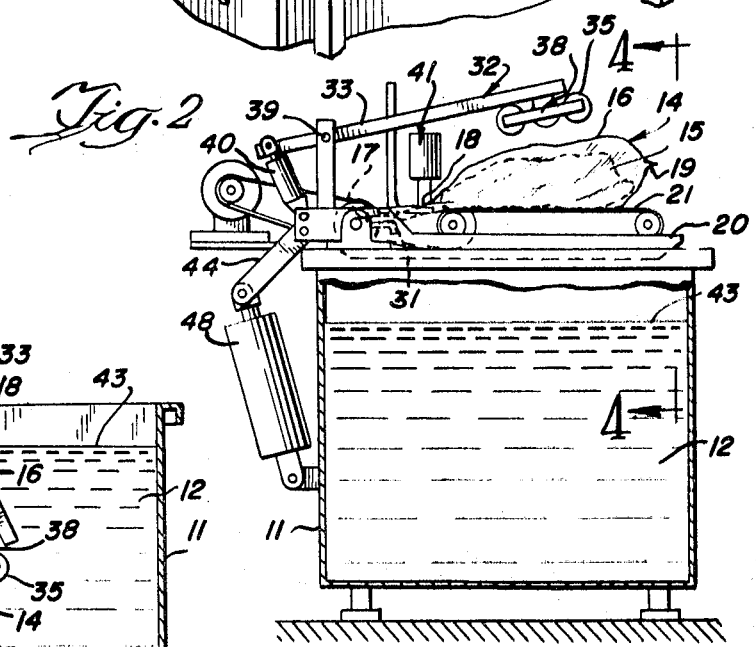
INVENTOR
Vytautas Kupcikevicius
BY Charles J. Mity
ATTORNEY

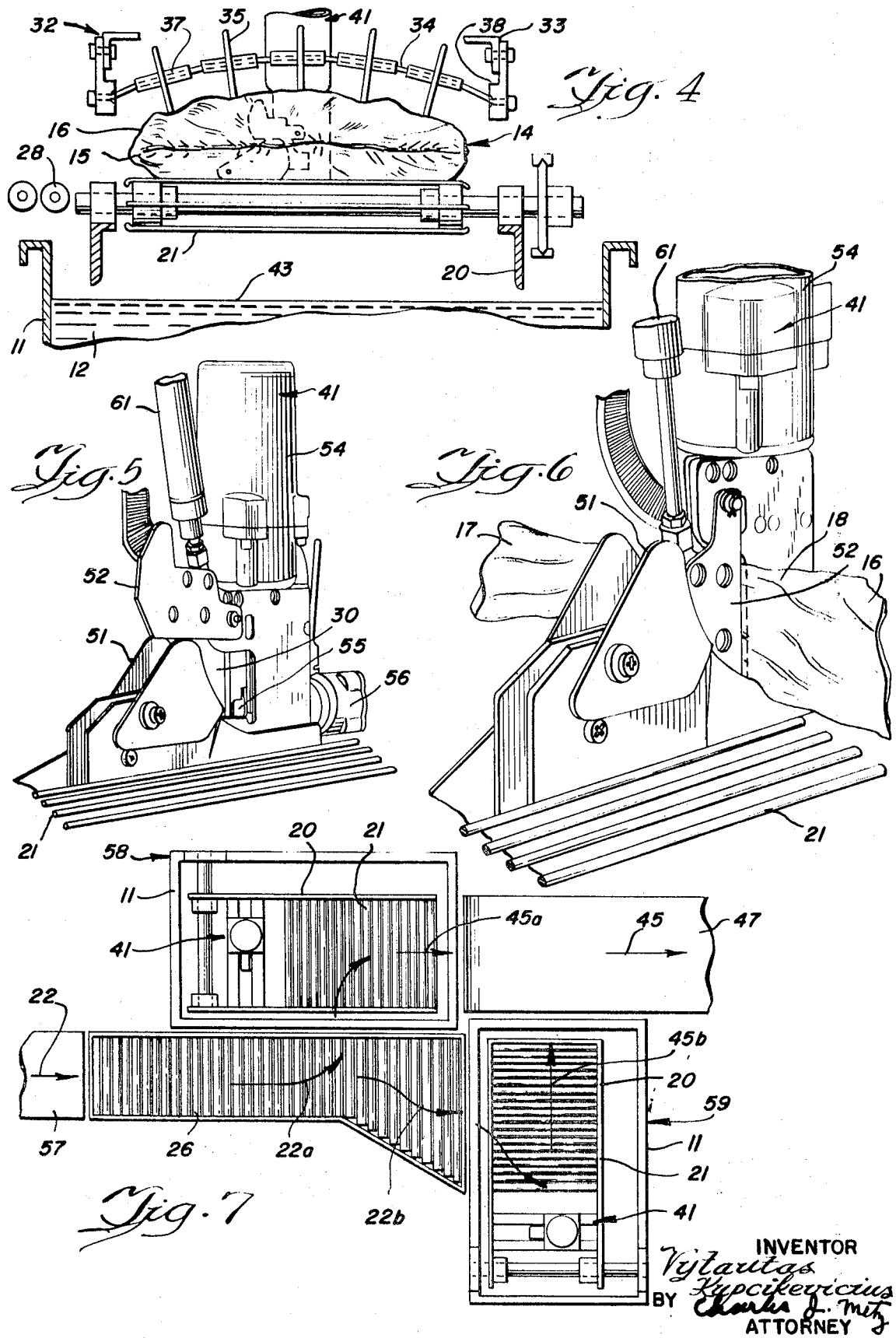

United States Patent Office 3,619,974
Patented Nov. 16, 1971

3,619,974
APPARATUS FOR EXPELLING AIR FROM A BAGGED PRODUCT
Vytautas Kupcikevicius, Chicago, Ill., assignor to Union Carbide Corporation, New York, N.Y.
Filed June 26, 1970, Ser. No. 50,201
Int. Cl. B65b 31/00
U.S. Cl. 53—79                                                      12 Claims

ABSTRACT OF THE DISCLOSURE

An apparatus for expelling air from a bagged product, such as a bagged meat product, is described. The apparatus includes a receptacle for containing a liquid, carrier means for immersing the bagged product in the liquid to expel the air from the bag, means for maintaining the open end of the bag above the level of the liquid while the bag is immersed in the liquid, and means for securely closing the open end of the bag while said bag is still immersed in the liquid.

---

The invention relates to an apparatus for expelling air from a bagged product, and in particular, from a bagged meat product.

In recent years there has been a distinct trend to slaughter cattle and other live-stock in the area where it is fattened. Until recently, the slaughtered beef has been shipped to retail outlets as "sides"; but now the trend is to break the sides down into smaller portions called primal cuts. This is helpful in marketing, since the individual store manager need purchase only those portions of the meat which he can sell most profitably. The less valuable portions of the meat can be processed at the slaughterhouse or other central locations. Thus, substantial economies have been realized.

In shipping meat that has been trimmed, however, the meat is exposed to air and bacteria which promotes spoilage. Therefore, it is necessary to protectively package the primal cuts of meat as they are prepared in order to prevent spoilage. The present invention provides an apparatus that is useful for expelling air from flexible film bags containing products such as meat. The expulsion of air from the bag is desired in order to prevent spoilage of the meat product such as would occur if the meat were exposed to air and bacteria.

One object of this invention is to provide an apparatus for expelling air from a bagged product.

Another object of the invention is to provide an apparatus for expelling air from a bagged meat product in order to enhance the shelf-life of the meat.

A further object of the invention is to provide an apparatus for expelling air from a bagged meat product by dipping the bagged meat product in a liquid.

A still further object of the invention is to provide an apparatus which will expel air from a bagged meat product and which will securely close the bag after the air has been expelled therefrom.

Further objects of the invention will be apparent from the following detailed description, the appended claims, and the several views illustrated in the accompanying drawings.

In the drawings:

FIG. 1 is a perspective of an apparatus embodying the principles of the invention.

FIG. 2 is a schematic side view of the same apparatus showing a bagged meat product in position on the platform prior to immersion in the liquid contained in the apparatus.

FIG. 3 is a schematic side view of the same apparatus showing the bagged meat product immersed in the liquid.

FIG. 4 is an enlarged view, partially in section, looking in the direction of the arrows 4—4 in FIG. 2, showing the product clamp in the engaged position.

FIG. 5 is an enlarged perspective view of the bag neck holding and clipping unit, showing the bag neck gathering plate retracted.

FIG. 6 is a further enlarged perspective view of the unit of FIG. 5 showing a bag in position in the unit and the bag neck gathering plate in the closed position.

FIG. 7 is a schematic plan view of two apparatuses embodying the principles of the invention arranged so that one operator can operate two machines, and utilizing common product feed and take away conveyors.

Referring now to FIGS. 1, 2, 3 and 4, wherein like numerals refer to like parts, an apparatus embodying the principles of the invention is shown. The apparatus includes a receptacle such as a tank 11 for holding a quantity of liquid 12 (the liquid preferably being water) sufficient to immerse at least the portion of a bag surrounding a product contained in said bag. In the figures, the bagged product is shown generally as 14. It comprises a meat product 15 contained in a bag 16 made of a flexible film. The flexible film can be polyethylene, polypropylene, polyvinylidene chloride, polyvinylidene chloride-vinyl chloride, polyvinyl chloride, or the like.

The bag 16 has one open end 17, a neck portion 18 adjacent to said open end 17, and a closed end 19.

At the top of the tank 11, a carrier means for holding the bagged product 14 includes a platform 20 having an endless rod type belt 21 mounted thereon. The rod type belt 21 forms a grating-like surface for supporting the bagged meat product 14.

In operation, the bagged meat product 14 (not shown in FIG. 1) is introduced in the direction of arrows 22 from a conveyor belt (not shown in FIG. 1) onto rollers 26. The bagged meat product 14 is moved along rollers 26 to a point adjacent to the platform 20, and is moved onto the platform 20 in the direction of the arrows 27 over roller 28 to the position shown in FIG. 2. The neck portion 18 of the bag 16 is then loosely gathered and inserted into an aperture 30 of the bag neck securing means shown generally in the figures as a combined bag neck holding and clipping unit 41. (The operation of the combined bag neck holding and clipping unit 41 is described below in greater detail in the discussion with respect to FIGS. 5 and 6.)

The bagged meat product 14 is then secured in position on the top surface of the rod type belt 21 by the product securing means. The product securing means is shown generally as a clamp 32 having a pair of spaced, independently operated substantially parallel arms 33. A pair of pivotally mounted toggle arms 38 are mounted at the ends of the parallel arms 33. Three cables 34 are slackly mounted between the toggle arms 38. Each of said cables 34 has a plurality of product contacting discs 35 mounted thereon in spaced relation to each other. The discs 35, having elongate hubs 37, are mounted on the cables 34 and are secured thereto by set screws (not shown). The fact that the cables 34 are slackly disposed between the parallel arms 33, and are attached thereto via the toggle arms 38, causes the clamp 32, at its points of contact with the bagged meat product 14 (the points of contact are the spaced discs 35), to conform to the upper surface of the bagged meat product 14. As the cables 34 conform to the upper surface of the bagged meat product 14, the elongate hubs 37 cause the discs 35 to assume positions substantially perpendicular to the upper surface of the meat product 14 at the individual points of contact.

The discs 35 are brought into contact with the bagged meat product 14 by rotating the arms 33 about pivot points 39. The clamp arms 33 are independently actuated by the piston rods of pneumatic cylinders 40, which in turn are mounted on an extension of the platform 20.

After the bagged meat product 14 has been secured in position on the platform 20, and the loosely gathered neck portion 18 of the bag 16 has been placed into the aperture 30 of the bag neck holding and clipping device 41, the platform 20 is pivoted downwardly from the position shown in FIGS. 1 and 2 to the position shown in FIG. 3. The platform 20 pivotally operated about a shaft 42 by actuation of a pneumatic cylinder 48, the rod of the cylinder 48 being rotatably secured to the link extension 44 of the platform 20. Desirably, the platform 20 is pivoted downwardly at least 45° from the horizontal, preferably, at least 60° from the horizontal, and more preferably, about 90° down from the horizontal. The clamp 32 maintains the clamping pressure on the bagged meat product 14 during this downward motion in order to maintain the bagged meat product 14 in position on the platform 20. The downward motion of the platform 20 immerses the portion of the bag 16 immediately surrounding the meat product 15 in the liquid 12 contained in the tank 11. The pivoting motion forces the bagged meat product 14 progressively into the liquid in a direction from the closed end 19 of the bag 16 toward the open end 17. The open structure of the rod type belt 21 supporting surface for the bagged meat product 14 permits the liquid 12 to contact the outer surface of the bag 16, and thereby hydrostatic pressure is imposed on the outside surface of the bag 16. The open structure of the rod type belt 21 as well as the fact that the clamp 32 contacts the surface of the bagged meat product 14 at intervals (i.e., only at the points of contact with the contact discs 35 which prevents the cables 34 from contacting the product 14 and interfering with the flow of air) permits air to flow outwardly through the open end 17 of the bag 16. After the air has been expelled from the bag 16 (that is, the air that was originally contained in the space between the outer surface of the product 15 and the inner surface of that portion of the bag 16 surrounding the meat product 14), the open end 17 of the bag 16 is then gathered and securely closed by fastening a metal clip about the neck portion 18 of the bag by the bag neck holding and clipping device 41 (the operation of this device 41 is explained in more detail below). Preferably, the clip is fastened around the neck portion of the bag at a point below the surface 43 of the liquid 12 contained in the tank 11. (The open end 17 of the bag 16 is maintained above the surface 43 of the liquid 12 by a holding plate 31 during the entire operation of the apparatus.) After clipping the neck portion 18 of the bag 16, the platform 20 is then pivoted upwardly to the position shown in FIGS. 1 and 2. The clamp 32 maintains the clamping pressure on the bagged meat product 14 until the platform 20 is back in the horizontal position.

The bagged product 14 from which substantially all of the air has been expelled is then unloaded from the platform 20 in the direction of arrows 45 over rollers 46 to a product take away conveyor 47. The rod type belt 21 is motor driven in the direction of arrow 50 in order to facilitate the unloading of the bagged meat product 14 from which the air has been expelled. The operation is then repeated by the loading of another bagged meat product 14 onto platform 20 as indicated above.

Referring now to FIGS. 5 and 6, the bag neck holding device and clipping unit 41 is shown in greater detail. The aperture 30 for receiving the loosely gathered neck portion 18 of the bag 16 is centrally aligned with the product supporting platform 20, and is positioned above the platform level about one-half of the average product height. In operation, the loosely gathered neck portion 18 of the bag 16 is inserted into the aperture 30 by depressing a spring biased swing gate 51. The gate 51 maintains the loosely gathered neck portion 18 of the bag 16 in position in the aperture 30. The unit 41 is also provided with a gathering member, shown as a gathering plate 52, for relatively tightly gathering the neck portion 18 of the bag 16 to a width less than the dimension of the open U of the clip to be fastened around the neck portion 18 by the clipping device 41. The gathering plate 52 is shown in the open position in FIG. 5 and the closed position in FIG. 6. The gathering plate 52 is closed by a pneumatic cylinder 61 after the air has been expelled from the bag 16, while the bagged product 14 is still immersed in the liquid 12, and before the clip is applied. After the neck portion 18 of the bag 16 has been gathered by the gathering plate 52, the pneumatic cylinder 54 of the clipper unit 41 operates to close a clip around a predetermined position on the neck portion 18 of the bag 16. A standard commercial clipper can be employed for this purpose.

The clip and bag neck 18 can be removed from the die of the clipper by a knockout plate 55 operated by a pneumatic cylinder 56.

It may be desired in some cases to provide means for controlling the temperature of the liquid 12 in the tank 11. For instance, it is desirable to maintain the liquid at a temperature below which shrinkage of the plastic film bag 16 occurs. For instance, liquid temperatures of from about 40° to about 100° F. are suitable. It may also be desirable to provide means for maintaining the liquid 12 in the tank 11 at substantially the same level. This can be accomplished, by methods well known in the art, such as by using an overflow and an inlet for continuous inflow of liquid.

The apparatus described above can be provided with conventional pneumatic control circuitry to automatically operate the apparatus in the above-indicated sequence.

Although the means described herein to energize and drive certain of the components of the apparatus of the present invention have been described as pneumatic means, it should be understood that other well known means, such as mechanical, hydraulic, electrical, and the like, or combinations thereof, can also be similarly employed.

In one valuable way of practicing the invention, two apparatuses embodying the principles of the invention can be cooperatively arranged as shown in FIG. 7 so that one operator can operate two machines. While one machine is dipping the bagged meat product, the other machine can be loaded. Thus, in operation, products can be received from a feed conveyor 57 in the direction of arrow 22. A first product can be loaded on a first unit 58 by moving the product in the direction of arrow 22a. While that product is being dipped in the liquid in the first unit 58, a second product is loaded on the second unit 59 by moving in the direction of arrow 22b. Then, the first product from which the air has been expelled is unloaded from the first unit 58 in the direction of arrow 45a onto product take away conveyor 47, and is removed in the direction of arrow 45. Then, the second product from which the air has been expelled is removed from the second unit 59 in the direction of arrow 45b and is removed by the product take away conveyor 47 in the direction of arrow 45.

While the foregoing invention has been described in some detail by way of illustration and example for purposes of clarity and understanding, it is understood that certain changes and modifications may be practiced within the spirit of the invention as limited only by the scope of the appended claims.

I claim:

1. Apparatus for expelling air from a bagged product, said bagged product comprising a product contained in a bag made of a flexible film, said bag having an open end, a closed end, and a neck portion adjacent to said open end, the air to be expelled being the air between the product and the inner surface of the portion of the bag surrounding said product, said apparatus comprising, in combination:

(a) a receptacle for containing a volume of liquid sufficient to immerse at least the portion of said bag surrounding said product;

(b) carrier means associated with said receptacle, including product supporting means and product securing means, for immersing in liquid contained in said receptacle at least the portion of said bag surrounding said product to expel air from said bag, the carrier means being arranged and constructed to force said bag into said liquid to a position at which the closed end of the bag is at a lower depth in the liquid than the neck portion of the bag, and said carrier means being arranged and constructed so as to permit said liquid to contact the outer surface of the portion of said bag surrounding said product and to permit the free flow of air out of said bag while said bag is immersed in said liquid;

(c) bag neck securing means in cooperative relationship with said carrier means for maintaining the open end of said bag above the level of said liquid while the portion of said bag surrounding said product is immersed in said liquid;

(d) bag closing means in cooperative relationship with said carrier means for securely closing said bag at a position in said neck portion after substantially all of the air has been expelled from the bag, and while the portion of said bag surrounding said product is still immersed in said liquid; and (e) means associated with said receptacle for removing the bagged product from said liquid.

2. Apparatus of claim 1 wherein said carrier means is pivotally supported at one end and is arranged and constructed to progressively force the bagged product into said liquid from said closed end of said bag toward said open end, and wherein said product securing means is constructed and arranged to maintain the bagged product in a predetermined position with respect to the product supporting means.

3. The apparatus of claim 2 wherein said product securing means includes at least one product shape conforming member.

4. The apparatus of claim 1 wherein said bag closing means is adapted to securely close said bag at a predetermined position under the surface of said liquid.

5. The apparatus of claim 1 wherein said bag closing means is adapted to fasten a permanent closure around said neck portion of said bag.

6. The apparatus of claim 4 wherein said bag closing means is adapted to fasten a metal closure around said neck portion of said bag.

7. The apparatus of claim 1, wherein said apparatus includes:

(a) a tank for containing liquid, including means for maintaining liquid contained in said tank substantially at a predetermined level;

(b) said carrier means being pivotally mounted on said tank, said carrier means including (i) product supporting means comprising a grating, and (ii) a clamp to secure the bagged product on said grating when said bagged product is immersed in said liquid, said clamp comprising a pair of spaced parallel arms having a plurality of cables slackly disposed transversely between said arms, said cables having a plurality of spaced product contacting members attached thereto, the said product contacting members being arranged and constructed such that contact between said cables and the bagged product is prevented when said bagged product is secured to said grating by said clamp;

(c) said neck securing means having an aperture constructed and arranged to receive and loosely hold the neck portion of said bag, said aperture also being positioned with respect to the carrier means such that the open end of said bag is maintained above the level of the liquid in the tank when the portion of said bag surrounding said product is immersed in the liquid, the bag neck securing means also being arranged and constructed to tightly gather and permanently close the said neck portion of the bag while said neck portion is maintained at a position below the level of said liquid after the air has been expelled from the bag.

8. The apparatus of claim 7 wherein said spaced parallel arms are independently operated.

9. The apparatus of claim 7 wherein said clamp is attached to said apparatus at a position adjacent to the end of said carrier means that is pivotally attached to said tank.

10. The apparatus of claim 7 wherein the product supporting means is adapted to pivot downwardly at least about 45° from the horizontal.

11. The apparatus of claim 7 wherein the bag neck securing means comprises an open side clipping device having its open side closed by a pivotally mounted gate to form said aperture, the said gate being constructed and arranged to permit the neck portion of the bag to be inserted in the aperture.

12. The apparatus of claim 11 wherein the clipping device includes means for automatically removing the formed clip from the clipping die.

References Cited
UNITED STATES PATENTS

| | | | |
|---|---|---|---|
| 2,672,268 | 3/1954 | Bower | 53—79 |
| 3,430,414 | 3/1969 | Ludwig et al. | 53—79 |

TRAVIS S. McGEHEE, Primary Examiner

U.S. Cl. X.R.

53—112 B